United States Patent Office 3,116,441
Patented Dec. 31, 1963

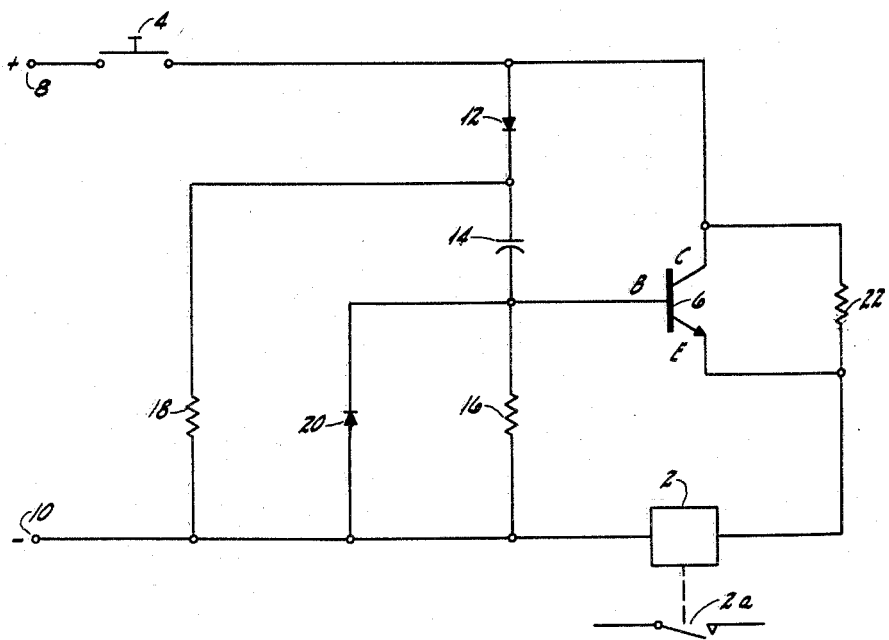

3,116,441
CIRCUIT FOR MAINTAINING A LOAD
ENERGIZED AT DECREASED POWER
FOLLOWING ENERGIZATION
Ward J. Gieffers, Chicago, Ill., assignor to International
Telephone and Telegraph Corporation
Filed Feb. 19, 1960, Ser. No. 9,804
6 Claims. (Cl. 317—148.5)

This invention relates to electrical control systems and more particularly to static circuitry for controlling electrical loads.

While not limited thereto, the invention is especially applicable to circuits for energizing electromagnetic loads and for maintaining the loads energized at decreased power following energization thereof or for supplying output currents varying with time or the like.

In the fields of electrical control and switching systems, it is often necessary to operate and to maintain operated a large number of electrical control devices such as relays, solenoids, and other similar devices. Also, in miniaturized and portable apparatus, it is necessary that the control devices be of minimum size. A characteristic of these devices is that they can be maintained operated by electrical currents of smaller magnitudes than those which are required to initially operate the same. To conserve electrical power and to enable use of power supply sources of minimum size, various expedients have been employed heretofore to decrease current flow to load devices following initial operation thereof. Use of auxiliary contacts to connect a current limiting resistor in series with a relay winding following energization of the latter has the disadvantages of wear and unreliability inherent in movable mechanical parts and increased physical size of the device. Use of an auxiliary contact to shunt a portion of a relay coil and to reinsert such portion effectively in the circuit upon energization of the relay has the aforementioned disadvantages as well as delayed operation of the relay. It has also been proposed to connect a capacitor-shunted resistor in series with the device. This circuit has the disadvantage that in certain applications the values of capacitance that are required are too large to be practical. Therefore, it is desirable to provide electrical control circuitry of the static type which overcomes the aforementioned disadvantages, which has no mechanical or moving parts, which operates substantially instantaneously and which comprises component parts of small physical size thereby adapting the same for miniaturization.

An object of the invention is to provide new and improved static electrical control circuitry.

A more specific object of the invention is to provide improved static means for controlling an electrical load.

Another specific object of the invention is to provide improved means having no mechanical moving parts for controlling current flow to an electrical device of the type requiring less current for maintaining energization thereof than is required for initial energization thereof.

Another object of the invention is to provide improved static control means for affording an output current varying with time in response to a unidirectional input voltage.

In accordance with the invention, an electrical control system is provided with a static control device of the semiconductor type or the like for supplying an output current in response to a unidirectional input voltage. A current limiting device is connected in a by-pass circuit across such static control device. And the control device is provided with automatically operable static control circuitry for initially effecting current flow through the control device and for thereafter diverting such current through the limiting device to the system output.

The aforementioned and other objects and advantages of the invention, together with the manner of obtaining them, will become more apparent and the invention itself will be best understood by making reference to the following detailed description of an embodiment of the invention in conjunction with the accompanying drawings in which:

The FIGURE shows a static circuit for controlling an electromagnetic relay constructed in accordance with the invention.

Referring to the single figure of the drawing, there is shown an electrical load device such as an electromagnetic relay having an operating coil 2, hereinafter referred to as relay 2, and a normally open contact 2a, the latter being connectable to a controlled circuit as desired. The operating coil of relay 2 is connected through a normally open pushbutton switch 4 and collector C and emitter E of a semi-conductor device such as a transistor 6 of the N-P-N conductivity type or the like across the positive and negative terminals 8 and 10, respectively, of a unidirectional power supply source, the operating coil of relay 2 being connected between emitter E and negative terminal 10. While switch 4 is shown as a manually operable pushbutton switch, it will be apparent that other types of switches such as automatically or electronically operable switches could be employed in place thereof. A biasing or control circuit for transistor 6 extends from the junction of switch 4 and collector C through a unidirectional conducting device such as a diode 12, a capacitor 14 and a resistor 16 to the junction of the operating coil of relay 2 and negative terminal 10, the junction of capacitor 14 and resistor 16 being connected to base B of transistor 6. A discharge circuit for capacitor 14 extends from the upper terminal thereof through a resistor 18 to the junction of negative terminal 10, and the operating coil of relay 2 and then through a unidirectional conducting device such as a diode 20 to the lower terminal of capacitor 14. A current limiting resistor 22 is connected between collector C and emitter E of transistor 6 in shunt of the main conducting path of the transistor.

The operation of the circuit will now be described. Let it be assumed that a direct current power supply source is connected across terminals 8 and 10 as indicated by the positive and negative symbols. When switch 4 is open, no current flows and base B and emitter E of transistor 6 are at the same voltage to maintain the transistor non-conducting. When switch 4 is closed, current flows from positive terminal 8 through switch 4, diode 12, capacitor 14 and resistor 16 to negative terminal 10. As a result, a high positive voltage corresponding to the voltage drop across resistor 16 is applied to base B of transistor 6 to render the latter conducting. The conducting circuit of transistor 6 is traced from terminal 8 through collector C, emitter E and the operating coil of relay 2 to terminal 10. The current flow through transistor 6 is sufficiently high to effectively short circuit resistor 22. This initial current flow which is limited only by the impedance of the operating coil of relay 2 causes energization of the latter to close contact 2a.

The aforementioned current flow through capacitor 14 causes the latter to charge thereby to decrease both the current flow through resistor 16 and the bias voltage at base B as a function of time. Such decrease in bias voltage correspondingly decreases the current flow through the main conducting path of transistor 6. The time rate of change of the latter current is a function of the product of the values of capacitor 14 and resistor 16. These values may be selected as desired to afford sufficient time for the load such as relay 2 to operate.

After a predetermined time interval, for example, a time interval equal to five times the product of the capacitance of capacitor 14 and the resistance of resistor 16, following closure of switch 4, capacitor 14 becomes fully charged. As a result, the positive bias voltage on base B of transistor 6 is decreased to a value to render the latter non-conducting. This action effectively removes the aforementioned short circuit across resistor 22 and effectively inserts resistor 22 in series with the operating coil of relay 2 to decrease the current flowing through the latter. The resistance value of resistor 22 is selected so that it will limit the current to a value sufficient to maintain relay 2 energized following initial energization thereof.

Resistor 18 and diode 20 provide a rapid discharge path for capacitor 14. When switch 4 is opened, the energizing circuit of the operating coil of relay 2 is interrupted to de-energize the relay and to open contact 2a. Opening of switch 4 also causes rapid discharge of capacitor 14 through resistor 18 and diode 20. During such discharge of capacitor 14, the function of diode 12 is to block current flow therethrough and through resistor 22, the operating coil of relay 2 and diode 20 which current flow might, in the absence of rectifier 12, maintain relay 2 energized. The function of diode 20 is to provide a discharge circuit for capacitor 14 in shunt of resistor 16 thereby to accelerate the discharge of the capacitor. Thus, the discharge current of capacitor 14 is limited only by the resistance of resistor 18.

It will be apparent that the circuit hereinbefore described can be employed to supply an output current which varies with time in response to a unidirectional input voltage for any desired application. When switch 5 is closed, the output current from emitter E of transistor 6 increases from zero value to its maximum value substantially instantaneously and then decreases as a function of time in accordance with the charging curve of capacitor 14 to an intermediate value depending upon the value of resistor 22. Alternatively, if resistor 22 is disconnected, the output current increases from zero value to its maximum value substantially instantaneously and then decreases as a function of time in accordance with the charging curve of capacitor 14 to zero value.

While the invention hereinbefore described is effectively adapted to fulfill the objects stated, I do not intend to confine my invention to the particular preferred embodiment of static control circuit disclosed, inasmuch as it is susceptible of various modifications without departing from the scope of the appended claims.

I claim:

1. In an electrical control system for energizing a load of the type requiring less current to maintain energization of the load than is required for initial energization thereof, an electrical power supply source, a controllable semi-conductor device connectible to said source for controlling energization of the load, said semi-conductor device having main electrodes and a control electrode, current limiting means comprising a resistor for limiting the current to the load when said semi-conductor device is rendered non-conducting, said current limiting means connected in parallel with said main electrodes, and control means comprising a capacitor and a resistor connected in a series circuit across said source, the junction of said capacitor and resistor connected to said control electrode to afford a bias voltage to render said semi-conductor device conductive when the latter is connected to said source, said capacitor charging responsive to current flow in said series circuit causing said bias voltage to decrease to render said semi-conductor device non-conducting, thereby rendering said current limiting means effective to decrease the current in the load circuit.

2. The invention defined in claim 1, together with a discharge circuit for said capacitor operable to discharge said capacitor when said source is disconnected, said discharge circuit comprising a unidirectional conducting device connected across said resistor for rapidly discharging said capacitor.

3. The invention defined in claim 2, together with a unidirectional conducting device in series with said capacitor for preventing discharge of the latter through the load.

4. In an electrical control system for energizing a relay of the type requiring less current to maintain operation of the relay than is required for initial operation thereof, a direct current power supply source, a transistor having collector and emitter and base electrodes, a switch for connecting said collector and emitter electrodes in circuit with the relay across said source, a control circuit for said transistor comprising a capacitor and a resistor connectable by said switch across said source, the junction of said capacitor and resistor being connected to said base electrode for applying a bias voltage to render said transistor conducting when said capacitor causing decrease in said bias voltage to render said transistor non-conducting as a function of time following operation of the relay, and a resistor connected across said collector and emitter electrodes for limiting the current flow to the relay to a value sufficient to maintain operation of the latter.

5. The invention defined in claim 4, together with a discharge circuit for said capacitor effective to discharge the latter when said switch is opened, said discharge circuit comprising resistance means and a unidirectional conducting device connecting in series across said capacitor, said unidirectional conducting device being connected in shunt of the first mentioned resistor to afford rapid discharge of said capacitor.

6. The invention defined in claim 5, together with a unidirectional conducting device in series circuit with said capacitor for preventing discharge of the latter through the relay.

References Cited in the file of this patent

UNITED STATES PATENTS

| 2,841,746 | Mawhinney | July 1, 1947 |
| 2,906,926 | Bauer | Sept. 29, 1959 |
| 2,923,863 | Chesson et al. | Feb. 2, 1960 |
| 2,927,247 | Hennis | Mar. 1, 1960 |
| 2,942,123 | Schuh | June 21, 1960 |
| 3,021,454 | Pickens | Feb. 13, 1962 |
| 3,084,310 | Schurr | Apr. 2, 1963 |

FOREIGN PATENTS

| 593,601 | Great Britain | Oct. 21, 1947 |

OTHER REFERENCES

Publication: Garner, "Radio and Television News," October 1953, pp. 68, 69, and 187.